Nov. 26, 1935.   W. R. BONHAM   2,022,555
TRANSMISSION MECHANISM
Filed May 22, 1931
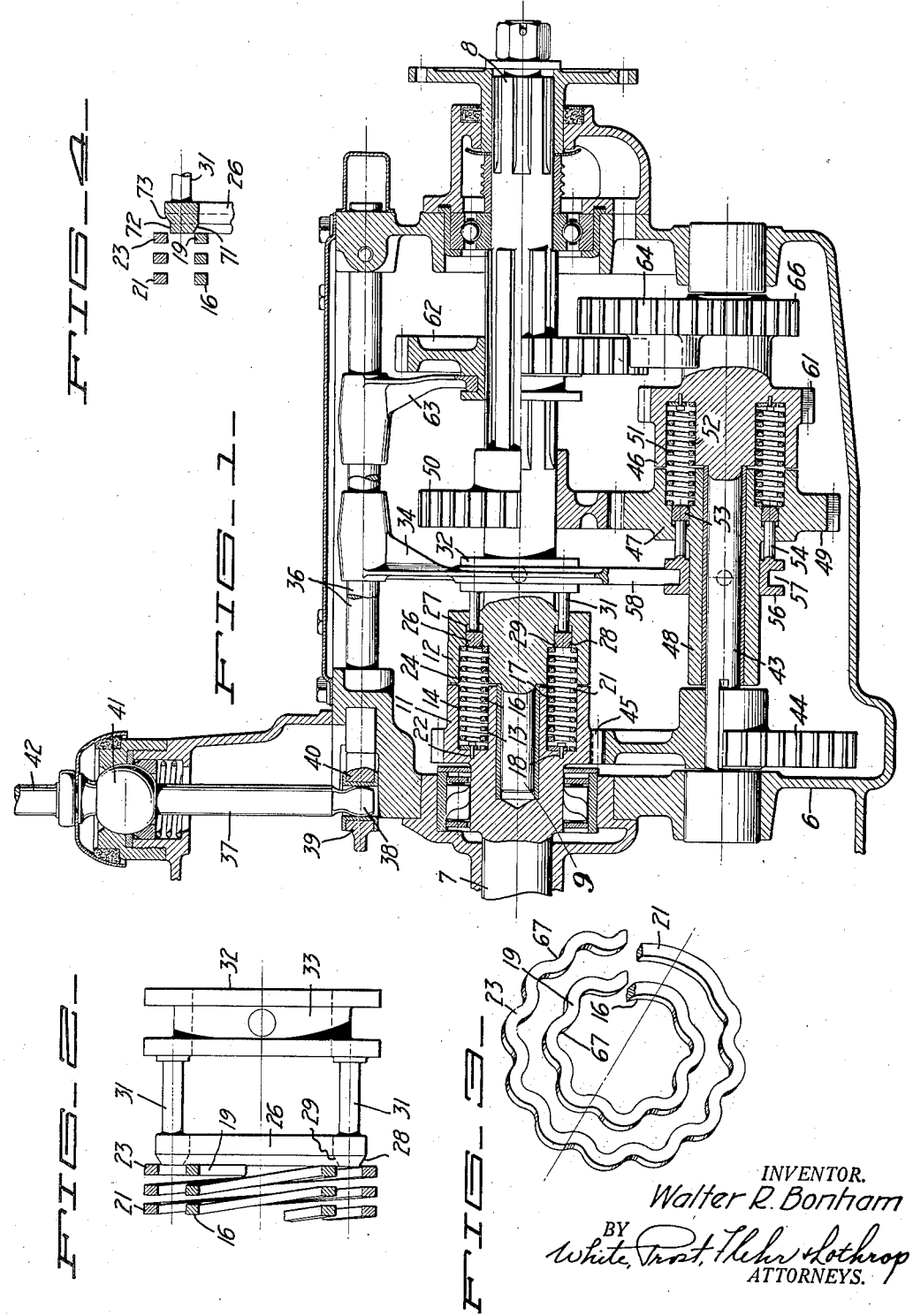
INVENTOR.
Walter R. Bonham
BY
White, Prost, Thehr & Lothrop
ATTORNEYS.

Patented Nov. 26, 1935

2,022,555

UNITED STATES PATENT OFFICE 2,022,555

TRANSMISSION MACHINE

Walter R. Bonham, Palo Alto, Calif.

Application May 22, 1931, Serial No. 539,258

12 Claims. (Cl. 192—48)

My invention relates to power transmissions such as clutching devices primarily useful in automotive vehicles for interposition between the engine and propeller shaft of such vehicles but is likewise capable of use in any power transmitting system in which driving and driven shafts are present.

An object of my invention is to provide a transmission mechanism in which the driving and driven shafts are positively coupled when the driving shaft tends to revolve at a speed in excess of the speed of the driven shaft but which declutches or uncouples the driving and driven shafts when the driven shaft tends to revolve at a speed in excess of the speed of the driving shaft.

Another object of my invention is to provide means for readily declutching or uncoupling the driving and driven shafts and as readily clutching or connecting the driving and driven shafts despite any difference in speed of the two shafts.

In the drawing, Figure 1 is a cross section on a longitudinal vertical plane through a change speed gear set embodying my invention.

Figure 2 is an enlarged view showing a portion of the coil springs together with a tapered ring for actuating the springs.

Figure 3 is a fragmentary perspective view of the waved end of the coil springs.

Figure 4 is a detail in cross section of a modified form of tapered ring.

In its preferred form, the device of my invention comprises a driving shaft having a driving sleeve surrounding and affixed to the driving shaft in axial alignment with a driven shaft having a driven sleeve surrounding and affixed to the driven shaft together with a coil spring encompassing the driving and driven shafts and affixed to the driving shaft and a coil spring within the driving and driven sleeves and affixed to the driving sleeve in combination with means adapted to be inserted between the two coil springs for actuating the springs to effect a clutching of the driving and driven shafts and driving and driven sleeves.

Although the transmission mechanism of my invention is adaptable for use in various different environments in power transmitting machinery I shall describe it in connection with an automotive change speed gear set wherein its usefulness is particularly apparent.

In the form of my invention disclosed in the drawing, I preferably provide a housing 6 which customarily is located in an automotive vehicle between the clutch and engine on the one hand and the propeller shaft on the other hand. Journaled in the forward wall of the housing 6 is a drive shaft 7 which is coupled to the engine usually through the medium of a disengageable clutch (not shown) provided with a suitable manual control. Likewise, mounted within the housing 6 is a driven shaft 8 which customarily extends to a propeller shaft (not shown) usually through an interposed universal joint or comparable device. The driving shaft 7 and the driven shaft 8 are in axial alignment and preferably they are mutually journaled, as at 9, for maintenance of alignment.

In accordance with my invention, I preferably provide the driving shaft 7 with a driving sleeve 11 which is affixed to and preferably integrally formed with the driving shaft 7 and is likewise concentric therewith. Mounted on and preferably formed integrally with the driven shaft 8 is a driven sleeve 12 which is concentric with the driven shaft and is in registry with the driving sleeve. The driving shaft 7 and driven shaft 8 are preferably machined to provide a substantially continuous surface 13 broken only at the abutting faces of the shafts. Similarly, the driving sleeve 11 and the driven sleeve 12 are machined to provide a substantially continuous surface 14 which is broken only at the abutting faces of the driving and driven sleeves.

Surrounding the driving and driven shafts is a coil spring 16 which extends substantially over the entire surface 13 and encompasses the shaft with a slight clearance which is shown exaggerated at 17. One end of the coil spring 16 is preferably secured to the driving shaft by any suitable means such as a fastening device 18. The free end of the coil spring 16 preferably terminates adjacent the driven sleeve 12 and is provided with a final convolution 19 of somewhat greater size than the remaining convolutions of the spring.

In a similar fashion a coil spring 21 surrounds the coil spring 16 and lies within the driving and driven sleeves 11 and 12, extending substantially for the entire length of the surface 14. One end of the spring 21 is preferably affixed to the driving shaft 7 by a fastening such as 22 while the free end of the coil spring 21 terminates adjacent the driven sleeve 12 and its final convolution 23 is somewhat larger than the remaining convolutions of the spring. The outer surface of the spring 21 is spaced from the surface 14 by a clearance as at 24 which is shown exaggerated. With the mechanism as so far described, rotation of the driving shaft has no effect whatsoever to rotate the driven shaft 8 and conversely rotation of the driven shaft 8 has no effect whatsoever upon the driving shaft 7. In this relationship of the parts the two shafts are declutched.

In order to clutch the shafts together and thereby transmit power mutually between them, I provide a tapered ring 26 within an annular channel 27 in the driven sleeve 12. The ring adjacent one end is provided with oppositely tapered conical faces 28 and 29 adapted to be forced between the convolutions 19 and 23 of the coil springs 16 and 21 and force the final convolutions against the surfaces 13 and 14 respectively. Such movement of the final convolutions causes the remainder of the spring coils to be urged into contact with the driving and driven shafts or the driving and driven sleeves depending upon the direction of relative rotation between the driving shaft 7 and the driven shaft 8. That is, if the driving shaft 7 tends to rotate say in a clockwise direction with respect or relative to the driven shaft 8, then the coil spring 16 tends to wind tightly upon the driving and driven shafts and in effect clutches them together as a solid shaft. On the other hand, if the driving shaft 7 tends to rotate anti-clockwise, say, with respect to the driven shaft 8 then although the coil spring 16 tends to unwind or declutch the driving shaft, nevertheless, the coil spring 21 tends to unwind within the driving sleeve 11 and the driven sleeve 12 and thereby clutch them together to form in effect a solid shaft. In this fashion the driving shaft 7 and the driven shaft 8 are clutched or locked together despite any fluctuation in rotation of the driving and driven shafts.

In order to move the tapered ring 26 from operative position wherein it actuates the coil springs 16 and 21, to inoperative position wherein it releases the coil springs 16 and 21 and permits the shafts to be declutched, I preferably mount the ring upon a plurality of rods 31 which extend through suitable apertures and are slidable within the driven sleeve 12. The rods 31 are affixed to a collar 32 slidable upon the driven shaft 8 and movable axially to translate the ring 26 through the medium of the rods 31. Preferably, the collar 32 is formed with a peripheral groove 33 within which a shifting fork 34 is seated so that movement of the shifting fork translates the collar 32. The shifting fork is mounted on a shifting rod 36 slidable within the housing 6 and moved by a shift lever 37 terminating in a ball end 38 engaging ears 39 and 40 on the shifting rod 36 and provided with a ball mounting 41 on the housing 6. An extension 42 of the shifting lever affords a handle for convenient manipulation of the shifting lever so that movement of the shifting lever causes the springs 16 and 21 to be actuated or to be released to clutch or declutch the driving shaft 7 and the driven shaft 8.

With this arrangement, when the shafts are declutched a simple movement of the shifting lever 37 immediately causes a complete locking or clutching between the two shafts smoothly and easily despite any difference in relative speed therebetween. Such arrangement provides for the usual neutral and high gear positions as is customary in automotive vehicles.

In order to provide an intermediate speed ratio I journal within the housing 6 a counter shaft 43 which at its forward end carries a gear 44 in mesh with a gear 45 fixed on the driving shaft 7 so that at all times during the rotation of the driving shaft the counter shaft 43 is likewise rotated and at a predetermined ratio to the speed of the driving shaft. On the counter shaft is located a counter shaft driving sleeve 46 in all respects comparable to the driving sleeve 11 and in axial alignment with the driving sleeve 46 is a driven sleeve 47 forming part of a lay shaft 48 which surrounds the counter shaft 43 and carries an intermediate speed gear 49 meshing with a gear 50 fixed on the driven shaft 8.

Within the driving sleeve 46 and driven sleeve 47 is a coil spring 51 in all respects comparable to the spring 21 while surrounding the counter shaft 43 and the lay shaft 48 is a coil spring 52 in all respects similar to the coil spring 16. For actuating the springs 51 and 52 a tapered ring 53 is mounted within the driven sleeve 47 and is provided with actuating rods 54 comparable to the rods 31. A collar 56 provided with a peripheral groove 57 encompasses the lay shaft 48 and the counter shaft 43 and is engaged by an extension 58 of the shifting fork 34. The arrangement of the shifting fork and of the tapered rings 26 and 53 is such that in the position shown in Figure 1 the shifting fork and the rings are both so located that they are in neutral position and neither the springs 16 and 21 nor the springs 51 and 52 are actuated. Movement of the shifting fork 34 to the left in Figure 1 actuates the springs 16 and 21 and provides for the direct coupling or drive from the driving shaft 7 to the driven shaft 8 while movement of the shifting fork 34 to the right in Figure 1 deenergizes the springs 16 and 21 but actuates the springs 51 and 52 to couple the counter shaft 43 and lay shaft 48 together so that in all respects they are comparable to a solid shaft. In the latter instance, the drive from the driving shaft 7 is from the gear 45 to the gear 44 through the counter shaft 43 and the counter shaft sleeve 46 to the driven sleeve 47 and the lay shaft 48 to the gear 49. From this gear, a gear 50 is driven and drives the driven shaft 8. The overall ratio in intermediate speed position between the driving shaft 7 and the driven shaft 8 depends upon the ratio between the gears 44 and 45 and 49 and 50.

The change speed gear set is also provided with low speed gears 61 and 62 respectively mounted on the counter shaft 43 and the driven shaft 8 and shifted by a shifting fork 63 in the customary fashion. The shifting fork is likewise capable of meshing the gear 62 with a reverse idler 64 and a reverse gear 66 mounted on the counter shaft 43 in the customary fashion. The shifting fork 63 is preferably arranged for connection with the shifting lever 37 in the usual manner.

With the transmission mechanism of my invention as so far described, the operator of the vehicle can move the shifting lever 37 at will to engage a direct drive or intermediate speed despite any difference in rotating speeds of the driving shaft 7 and the driven shaft 8 so that his vehicle need never be out of control through inability to engage the various desired speeds.

As shown greatly exaggerated in Figure 3, in order to facilitate the engagement of the tapered rings 26 and 53 with the end convolution of the coil springs I preferably form such end convolutions with a wave or undulation 67 of a relatively minute extent so that the frictional engagement and displacement of the undulations in the springs by means of the rings 26 and 53 will result in a firm but smooth engagement.

Under some conditions it is desirable that the driving shaft 7 and the driven shaft 8 be clutched or engaged when the driving shaft tends to revolve faster than the driven shaft but that the shafts be declutched or disengaged when the driven shaft 8 tends to revolve faster than the driving shaft 7. Under such conditions, I preferably form the tapered rings as shown in Figure 4. In this modification, the ring is provided with a tapered face 71 comparable to the face 29 but instead of being provided with a tapered face comparable to 28 is rather provided with a cylindrical surface 72 merging with a conical surface 73. With this arrangement, when the shifting fork 34 is initially moved toward actuating position from neutral position the tapered face 71 first engages the coil spring 16 and the resulting friction is sufficient to cause the spring 16 to wrap around the driving shaft 7 and the driven shaft 8 when the driving shaft tends to revolve faster than the driven shaft but causes the spring to unwind and to declutch the shaft when the driven shaft tends to revolve faster than the driving shaft. When the ring is translated farther into actuating position, the face 71 continues to cause engagement of the spring 16 while the conical surface 73 actuates and engages the spring 21 so that the driving shaft 7 and driven shaft 8 are locked together or clutched together despite any tendency toward variation in speed between the shafts.

A similar arrangement can be provided in place of the ring 53 so that in the direct drive and intermediate drive positions the operator can provide either for an entirely declutched relationship, an entirely clutched relationship or a median relationship in which the driving and driven shafts are automatically declutched when the relative direction or revolution of the driving and driven shafts is in a predetermined direction but so that the shafts are firmly clutched when the direction of relative revolution of the two shafts is in the opposite direction.

Although I have disclosed the transmission mechanism of my invention provided with clutches for the direct drive and intermediate drive condition such clutches can likewise be provided on the low speed drive and reverse speed drive if desired, but since these latter two speeds are relatively infrequently used, ordinarily the clutches are not provided for them.

I claim:

1. A transmission comprising a driving shaft, a driving sleeve surrounding and secured to said shaft, a driven shaft, a driven sleeve surrounding and secured to said driven shaft, said shafts and said sleeves being in axial alignment, a first coil spring surrounding said driving and driven shafts and secured to said driving shaft, a second coil spring within said driving and driven sleeves and secured to said driving sleeves, and means for forcing said first coil spring into engagement with said driven shaft and for forcing said second coil spring into engagement with said driven sleeve.

2. A transmission as in claim 1 in which said means is a tapered ring adapted to be forced between said springs.

3. A transmission as in claim 1 in which said means is movable between an operative position and an inoperative position.

4. A transmission comprising a driving shaft, a driven shaft, a first means including a coil spring dependent upon rotation of said driving shaft in one direction relative to said driven shaft for clutching said shafts together, a second means including a coil spring dependent upon rotation of said driving shaft in the opposite direction relative to said driven shaft for clutching said shafts together, and means for successively actuating said first means and said second means.

5. A transmission comprising a driving shaft, a driven shaft, a first means including a coil spring dependent upon rotation of said driving shaft in one direction relative to said driven shaft for clutching said shafts together, a second means including a coil spring dependent upon rotation of said driving shaft in the opposite direction relative to said driven shaft for clutching said shafts together, and means for successively actuating said first means and said second means by engagement with said coil springs.

6. A transmission comprising a driving shaft, a driven shaft, a first means including a coil spring dependent upon rotation of said driving shaft in one direction relative to said driven shaft for clutching said shafts together, a second means including a coil spring dependent upon rotation of said driving shaft in the opposite direction relative to said driven shaft for clutching said shafts together, and means for actuating said first means and said second means successively by engagement with said coil springs.

7. A transmission comprising a driving shaft, a driving sleeve surrounding and secured to said shaft, a driven shaft, a driven sleeve surrounding and secured to said driven shaft, a first coil spring surrounding said driving and driven shafts and dependent upon rotation of said driving shaft in one direction relative to said driven shaft for clutching said shafts together, a second coil spring within said driving and driven sleeves and dependent upon rotation of said driving sleeve in the opposite direction relative to said driven sleeve for clutching said sleeves together, and means for actuating said first spring and said second spring.

8. A transmission comprising a driving shaft, a driving sleeve surrounding and secured to said shaft, a driven shaft, a driven sleeve surrounding and secured to said driven shaft, a first coil spring surrounding said driving and said driven shafts, a second coil spring within said driving and said driven sleeves and encompassing said first spring, one end of said first spring being secured to said driving shaft and one end of said second spring being secured to said driving sleeve, and means including a tapered ring adapted to be forced between said first and said second springs at their free ends.

9. In a speed change transmission the combination of a driving member having a circular recess, a driven member having a circular recess facing the circular recess of the driving member, a coil spring located in said recesses adjacent the outer walls of the recesses, another coil spring in said same recesses adjacent the inner peripheral walls of the recesses, means for effecting frictional engagement of said springs with both driving and driven members, one of said springs being arranged to frictionally engage the recess walls to establish driving connection when the driving member tends to actuate the driven member, the other of said springs being arranged to engage the other recess walls when the driven member tends to overrun the driving member.

10. In a speed change transmission the combination of a driving member, a driven member, said members having opposed circular recesses, two coil springs located in said recesses, one within the other, the outer surface of one spring being adjacent the outer walls of the recesses, and the inner surfaces of the other spring being adjacent the inner walls of said recesses, means for effecting frictional engagement of said springs with both driving and driven members, the outer spring being adapted to expand so that its convolutions frictionally engage the outer walls of the recesses when one member tends to drive the other, and the inner spring being adapted to contract with its convolutions frictionally engaging the inner walls of said recesses when the driving tendency is reversed.

11. In a speed change transmission the combination of a driving member, a driven member, said members having opposed circular recesses, a pair of coil springs one disposed within the other and both located in said recesses, means for establishing a frictional engagement of the coil springs with said driving and driven members, the outer spring expanding to frictionally engage the outer circular walls of the recesses when the drive is in one direction, and the inner spring contracting to frictionally engage the inner walls of the recesses when the drive is in reverse direction.

12. In a speed change transmission the combination of a driving member, a driven member, said members having opposed circular recesses, a pair of coil springs one disposed within the other and both located in said recesses, means for establishing a frictional engagement of the coil springs with said driving and driven members, the outer spring expanding to frictionally engage the outer circular walls of the recesses when the drive is in one direction, and the inner spring contracting to frictionally engage the inner walls of the recesses when the drive is in reverse direction, said means being arranged to permit frictional disengagement of the springs with at least one of said members whereby the driving and driven members may actuate independently.

WALTER R. BONHAM.